US012667052B2

(12) United States Patent     (10) Patent No.:   US 12,667,052 B2

Zielke et al.     (45) Date of Patent:   *Jun. 30, 2026

(54) APPARATUS, SYSTEMS AND METHODS FOR ELIMINATING CROSS-TRACK ERROR

(71) Applicant: Ag Leader Technology, Ames, IA (US)

(72) Inventors: Roger Zielke, Huxley, IA (US); Scott Eichhorn, Ames, IA (US)

(73) Assignee: Ag Leader Technology, Ames, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/132,088

(22) Filed: Apr. 7, 2023

(65) Prior Publication Data

US 2023/0240185 A1   Aug. 3, 2023

Related U.S. Application Data

(63) Continuation of application No. 16/918,300, filed on Jul. 1, 2020, now Pat. No. 11,678,607.

(51) Int. Cl.
*A01D 41/127*    (2006.01)
*A01D 45/02*    (2006.01)

(52) U.S. Cl.
CPC ..... *A01D 41/1278* (2013.01); *A01D 41/1271* (2013.01); *A01D 45/021* (2013.01)

(58) Field of Classification Search
CPC .............. A01D 41/1278; A01D 45/021; A01D 41/1271
See application file for complete search history.

(56) References Cited

U.S. PATENT DOCUMENTS

| | | |
|---|---|---|
| 2,419,061 A | 4/1947 | Emery |
| 2,813,709 A | 11/1957 | Hyman |
| 3,007,570 A | 11/1961 | Davidson |
| 3,038,544 A | 6/1962 | Richey et al. |
| 3,178,873 A | 4/1965 | Meyer |
| 3,246,701 A | 4/1966 | Horst |

(Continued)

FOREIGN PATENT DOCUMENTS

| | | |
|---|---|---|
| AU | 2020201559 B2 | 4/2020 |
| BE | 1023764 B1 | 7/2017 |

(Continued)

OTHER PUBLICATIONS

John Deere SSA, "AutoTrac RowSense | Precision AG | John Deere SSA", Jan. 2021, https://www.deere.com/sub-saharan/en/technology-products/precision-ag/autotrac-rowsense/.

(Continued)

*Primary Examiner* — Alicia Torres

(74) *Attorney, Agent, or Firm* — DENTONS DAVIS BROWN PC; Matthew Warner-Blankenship; Kassandra Ricklefs

(57) ABSTRACT

A cross track error system including a corn head, a row unit disposed on the corn head. The row unit including a set of stripper plates, a resilient member disposed proximal to the stripper plates, a sensor unit in communication with the resilient member, and a processor. The processor is constructed and arranged to process signals generated by the sensor unit in response to deflection of the resilient member.

11 Claims, 14 Drawing Sheets

(56) References Cited

U.S. PATENT DOCUMENTS

| | | | |
|---|---|---|---|
| 3,271,940 A | 9/1966 | Robert | |
| 3,616,690 A | 11/1971 | Harden | |
| 3,780,817 A | 12/1973 | Videon | |
| 3,853,000 A | 12/1974 | Barnett | |
| 3,972,381 A | 8/1976 | Gail | |
| 3,992,933 A | 11/1976 | Randolph | |
| 4,121,049 A | 10/1978 | Roeber | |
| 4,126,984 A | 11/1978 | Gail | |
| 4,166,349 A | 9/1979 | Coenenberg et al. | |
| 4,197,690 A * | 4/1980 | Eistert ................. A01D 41/1278 |
| | | | 180/401 |
| 4,295,323 A * | 10/1981 | Maier ................... A01B 69/004 |
| | | | 56/10.2 R |
| 4,362,218 A | 12/1982 | Shoberg | |
| 4,418,521 A | 12/1983 | Orlando | |
| 4,423,640 A | 1/1984 | Jetter | |
| 4,505,094 A | 3/1985 | Demorest | |
| 4,528,804 A | 7/1985 | Williams | |
| 4,751,849 A | 6/1988 | Paros | |
| 4,883,964 A | 11/1989 | Bohman | |
| 4,896,491 A | 1/1990 | Warnsholz | |
| 4,918,441 A | 4/1990 | Bohman | |
| 4,967,362 A * | 10/1990 | Schutten ............... G05D 1/0227 |
| | | | 701/50 |
| 5,044,210 A | 9/1991 | Kuhn et al. | |
| 5,216,795 A | 6/1993 | Hansson | |
| 5,264,709 A | 11/1993 | Kamimura | |
| 5,343,761 A | 9/1994 | Myers | |
| 5,369,603 A | 11/1994 | Myers | |
| 5,463,854 A | 11/1995 | Chmielewski, Jr. | |
| 5,480,354 A | 1/1996 | Sadjadi | |
| 5,568,405 A | 10/1996 | Easton et al. | |
| 5,598,794 A | 2/1997 | Harms et al. | |
| 5,638,988 A | 6/1997 | Rogers | |
| 5,680,750 A | 10/1997 | Stefl | |
| 5,751,576 A | 5/1998 | Monson | |
| 5,790,428 A | 8/1998 | Easton et al. | |
| 5,847,290 A | 12/1998 | Kim | |
| 5,878,561 A | 3/1999 | Gunn | |
| 5,921,070 A | 7/1999 | Chamberlain | |
| 5,927,054 A | 7/1999 | Chamberlain | |
| 5,991,694 A | 11/1999 | Gudat et al. | |
| 6,041,583 A | 3/2000 | Goering | |
| 6,073,427 A | 6/2000 | Nichols | |
| 6,085,846 A | 7/2000 | Buchl et al. | |
| 6,092,476 A | 7/2000 | Wilson | |
| 6,119,442 A | 9/2000 | Hale | |
| 6,202,395 B1 | 3/2001 | Gramm | |
| 6,216,795 B1 | 4/2001 | Buchl | |
| 6,272,819 B1 | 8/2001 | Wendte | |
| 6,431,981 B1 | 8/2002 | Shinners | |
| 6,530,197 B1 | 3/2003 | Christensen | |
| 6,584,390 B2 | 6/2003 | Beck | |
| 6,615,570 B2 | 9/2003 | Beck | |
| 6,668,223 B2 | 12/2003 | Blackmore et al. | |
| 6,774,320 B2 | 8/2004 | Simons | |
| 6,983,582 B1 | 1/2006 | Muckler | |
| 7,354,341 B1 | 4/2008 | Smith | |
| 7,357,036 B2 | 4/2008 | Steprath | |
| 7,401,506 B2 | 7/2008 | Kunow | |
| 7,401,528 B2 | 7/2008 | Deppermann et al. | |
| 7,647,753 B2 | 1/2010 | Schlipf | |
| 7,716,905 B2 | 5/2010 | Wilcox et al. | |
| 7,739,861 B2 | 6/2010 | Mackin | |
| 7,790,991 B2 | 9/2010 | Verhaeghe | |
| 7,916,898 B2 | 3/2011 | Anderson | |
| 8,006,472 B1 | 8/2011 | Schreiner | |
| 8,010,261 B2 | 8/2011 | Brubaker | |
| 8,196,380 B2 | 6/2012 | Carboni | |
| 8,201,388 B1 | 6/2012 | Vandeven | |
| 8,215,191 B2 | 7/2012 | Tragesser et al. | |
| 8,220,235 B2 * | 7/2012 | Kowalchuk .......... A01D 45/021 |
| | | | 56/62 |
| 8,224,534 B2 | 7/2012 | Kowalchuk | |
| 8,418,636 B2 | 4/2013 | Liu et al. | |

| | | | |
|---|---|---|---|
| 8,820,039 B2 | 9/2014 | Werning | |
| 8,987,615 B2 | 3/2015 | Khatavkar | |
| 9,030,549 B2 | 5/2015 | Redden | |
| 9,064,173 B2 | 6/2015 | Redden | |
| 9,066,463 B2 | 6/2015 | Lange | |
| 9,213,905 B2 | 12/2015 | Lange | |
| 9,232,693 B2 | 1/2016 | Hendrickson et al. | |
| 9,282,693 B2 | 3/2016 | Anderson | |
| 9,310,329 B2 | 4/2016 | Acheson et al. | |
| 9,320,196 B2 | 4/2016 | Dybro et al. | |
| 9,322,629 B2 | 4/2016 | Sauder et al. | |
| 9,360,383 B2 | 6/2016 | Coleman | |
| 9,372,109 B2 | 6/2016 | Acheson et al. | |
| 9,410,840 B2 | 8/2016 | Acheson et al. | |
| 9,423,249 B2 | 8/2016 | Deppermann et al. | |
| 9,485,914 B2 | 11/2016 | Schleicher et al. | |
| 9,565,802 B2 * | 2/2017 | Schleicher ............. G01D 5/142 |
| 9,578,804 B2 | 2/2017 | Gessel | |
| 9,578,808 B2 | 2/2017 | Dybro | |
| 9,609,806 B2 | 4/2017 | Schlipf | |
| 9,645,006 B2 | 5/2017 | Phelan | |
| 9,658,201 B2 | 5/2017 | Redden et al. | |
| 9,668,412 B2 | 6/2017 | Ritter | |
| 9,668,420 B2 | 6/2017 | Anderson | |
| 9,693,496 B2 | 7/2017 | Tevs et al. | |
| 9,693,503 B2 | 7/2017 | Dybro et al. | |
| 9,696,162 B2 | 7/2017 | Anderson | |
| 9,717,171 B2 | 8/2017 | Redden et al. | |
| 9,756,771 B2 | 9/2017 | Redden | |
| 9,804,097 B1 | 10/2017 | Tang et al. | |
| 9,826,673 B1 | 11/2017 | Ray | |
| 9,832,928 B2 | 12/2017 | Dybro et al. | |
| 9,867,334 B2 | 1/2018 | Jongmans et al. | |
| 9,867,335 B2 | 1/2018 | Obbink et al. | |
| 9,894,835 B2 | 2/2018 | Sauder et al. | |
| 9,921,064 B2 | 3/2018 | Schleicher | |
| 9,927,242 B2 | 3/2018 | Schleicher | |
| 9,936,631 B1 | 4/2018 | Hubner et al. | |
| 9,936,637 B2 | 4/2018 | Anderson et al. | |
| 9,972,058 B2 | 5/2018 | Romier | |
| 9,974,233 B2 | 5/2018 | Ueda et al. | |
| 9,983,048 B1 | 5/2018 | Meier | |
| 10,034,424 B2 | 7/2018 | Anderson et al. | |
| 10,039,228 B2 | 8/2018 | Walker | |
| 10,039,231 B2 | 8/2018 | Anderson et al. | |
| 10,130,035 B2 | 11/2018 | Crow | |
| 10,178,828 B2 | 1/2019 | Hendrickson et al. | |
| 10,188,037 B2 | 1/2019 | Sauder | |
| 10,255,670 B1 | 4/2019 | Wu | |
| 10,295,703 B2 | 5/2019 | Dybro | |
| 10,299,422 B2 | 5/2019 | Schleicher | |
| 10,473,592 B2 | 11/2019 | Kramer et al. | |
| 10,537,060 B2 | 1/2020 | Sauder et al. | |
| 10,582,662 B2 | 3/2020 | Ricketts | |
| 10,713,768 B2 | 7/2020 | Berghoefer | |
| 10,820,508 B2 | 11/2020 | Dix et al. | |
| 10,859,479 B2 | 12/2020 | Brune et al. | |
| 11,048,938 B2 | 6/2021 | Hundley et al. | |
| 11,064,653 B2 | 7/2021 | Zielke | |
| 11,079,725 B2 | 8/2021 | Palla | |
| 11,129,333 B2 | 9/2021 | Derscheid | |
| 11,234,366 B2 | 2/2022 | Darr | |
| 11,275,941 B2 | 3/2022 | Papanikolopoulos et al. | |
| 11,297,768 B2 | 4/2022 | Schildroth | |
| 11,432,464 B2 | 9/2022 | Hayashi | |
| 11,678,607 B2 * | 6/2023 | Zielke ................. A01D 41/1271 |
| | | | 56/10.2 R |
| 11,704,810 B2 | 7/2023 | Sneyders | |
| 11,758,845 B2 | 9/2023 | Zielke | |
| 11,758,848 B2 | 9/2023 | Eichhorn | |
| 2002/0091458 A1 | 7/2002 | Moore | |
| 2002/0173893 A1 | 11/2002 | Blackmore et al. | |
| 2003/0019196 A1 | 1/2003 | Coers | |
| 2004/0050138 A1 | 3/2004 | Beck | |
| 2004/0194442 A1 | 10/2004 | Maertens | |
| 2007/0044445 A1 | 3/2007 | Spicer et al. | |
| 2007/0228707 A1 | 10/2007 | Curtis | |
| 2007/0289281 A1 | 12/2007 | Altepost | |
| 2008/0046154 A1 | 2/2008 | Bares | |

(56) References Cited

U.S. PATENT DOCUMENTS

| | | |
|---|---|---|
| 2009/0192734 A1 | 7/2009 | Mackin |
| 2010/0089178 A1 | 4/2010 | Tragresser |
| 2010/0228521 A1 | 9/2010 | Hamamoto |
| 2011/0173942 A1 | 7/2011 | Kowalchuk |
| 2012/0029757 A1 | 2/2012 | Kowalchuk |
| 2012/0042618 A1 | 2/2012 | Lohrentz |
| 2012/0042619 A1 | 2/2012 | Lohrentz et al. |
| 2012/0055131 A1 | 3/2012 | Zegota |
| 2012/0055133 A1 | 3/2012 | Lohrentz |
| 2012/0204528 A1 | 8/2012 | Regier |
| 2012/0253611 A1 | 10/2012 | Zielke |
| 2013/0125800 A1 | 5/2013 | Landphair et al. |
| 2013/0152535 A1 | 6/2013 | Roberge |
| 2014/0020354 A1 | 1/2014 | Tilly |
| 2014/0116077 A1 | 5/2014 | Pierce |
| 2014/0230391 A1 | 8/2014 | Hendrickson |
| 2014/0230580 A1 | 8/2014 | Dybro |
| 2014/0236381 A1 | 8/2014 | Anderson |
| 2014/0294247 A1 | 10/2014 | Sirault |
| 2014/0311113 A1 | 10/2014 | Bonefas |
| 2014/0331631 A1 | 11/2014 | Sauder |
| 2015/0082760 A1 | 3/2015 | Zentner |
| 2015/0082780 A1 | 3/2015 | Dueckinghaus |
| 2015/0245560 A1 | 9/2015 | Middelberg |
| 2015/0253427 A1 | 9/2015 | Slitcher |
| 2015/0257337 A1 | 9/2015 | Schrattenecker |
| 2015/0289438 A1 | 10/2015 | Sauder et al. |
| 2015/0293029 A1 | 10/2015 | Acheson |
| 2015/0293068 A1 | 10/2015 | Acheson et al. |
| 2015/0302305 A1 | 10/2015 | Rupp |
| 2015/0319929 A1 | 11/2015 | Hendrickson |
| 2015/0327440 A1 | 11/2015 | Dybro |
| 2015/0334920 A1 | 11/2015 | Schleicher |
| 2016/0037709 A1 | 2/2016 | Sauder et al. |
| 2016/0041803 A1 | 2/2016 | Markov |
| 2016/0077075 A1 | 3/2016 | Reich |
| 2016/0084813 A1 | 3/2016 | Anderson |
| 2016/0084987 A1 | 3/2016 | Dybro |
| 2016/0120129 A1 | 5/2016 | Verhaeghe |
| 2016/0174465 A1 | 6/2016 | Kohls |
| 2016/0252384 A1 | 9/2016 | Wilson |
| 2016/0338267 A1 | 11/2016 | Anderson |
| 2016/0345485 A1 | 12/2016 | Acheson |
| 2017/0061211 A1 | 3/2017 | Hundley et al. |
| 2017/0089742 A1 | 3/2017 | Bruns |
| 2017/0199528 A1 | 7/2017 | Detweiler |
| 2017/0228118 A1 | 8/2017 | Sugumarn et al. |
| 2017/0251600 A1 | 9/2017 | Anderson |
| 2017/0332551 A1 | 11/2017 | Todd |
| 2017/0339827 A1 | 11/2017 | Anderson |
| 2018/0017965 A1 | 1/2018 | Kosa |
| 2018/0084725 A1 | 3/2018 | Ostermeier |
| 2018/0092303 A1 | 4/2018 | Goering |
| 2018/0121725 A1 | 5/2018 | Redden |
| 2018/0164471 A1 | 6/2018 | Dybro |
| 2018/0199509 A1 | 7/2018 | Ricketts |
| 2018/0228086 A1 | 8/2018 | Cook |
| 2018/0338423 A1 | 11/2018 | Lucca |
| 2018/0368321 A1 | 12/2018 | Noonan |
| 2018/0373259 A1* | 12/2018 | Aberle .................... B62D 1/28 |
| 2019/0000007 A1 | 1/2019 | Schleicher |
| 2019/0059223 A1 | 2/2019 | Seiders |
| 2019/0110394 A1 | 4/2019 | VanNahmen |
| 2019/0150357 A1 | 5/2019 | Wu |
| 2019/0174667 A1 | 6/2019 | Gresch |
| 2019/0195762 A1 | 6/2019 | Brune |
| 2019/0258859 A1 | 8/2019 | Baynes |
| 2019/0261561 A1 | 8/2019 | Heitmann |
| 2020/0000031 A1 | 1/2020 | Koch |
| 2020/0000034 A1 | 1/2020 | Schlipf |
| 2020/0008351 A1 | 1/2020 | Zielke |
| 2020/0053961 A1 | 2/2020 | Dix |
| 2020/0060056 A1 | 2/2020 | Koch |
| 2020/0068803 A1 | 3/2020 | Sauder et al. |
| 2020/0326674 A1 | 10/2020 | Palla |
| 2020/0394580 A1 | 12/2020 | Bull |
| 2021/0051849 A1 | 2/2021 | Asebedo |
| 2021/0059114 A1 | 3/2021 | Eichhorn |
| 2021/0076569 A1 | 3/2021 | Blank |
| 2021/0132618 A1 | 5/2021 | Van Roekel |
| 2021/0168991 A1 | 6/2021 | Dix |
| 2021/0195824 A1 | 7/2021 | Van Roekel |
| 2021/0315160 A1 | 10/2021 | Zielke |
| 2021/0318118 A1 | 10/2021 | Eichhorn |
| 2021/0321567 A1 | 10/2021 | Sidon |
| 2021/0329837 A1 | 10/2021 | Schnaider |
| 2021/0329838 A1 | 10/2021 | Zielke |
| 2021/0340794 A1 | 11/2021 | Dickinson |
| 2021/0352847 A1 | 11/2021 | Hunt |
| 2022/0000024 A1 | 1/2022 | Zielke |
| 2022/0000029 A1 | 1/2022 | Ricketts |
| 2022/0071093 A1 | 3/2022 | Risius |
| 2022/0078975 A1 | 3/2022 | Slichter |
| 2022/0132737 A1 | 5/2022 | Anderson |
| 2022/0192082 A1 | 6/2022 | Rosenberg |
| 2022/0225569 A1 | 7/2022 | Zielke |
| 2022/0232759 A1 | 7/2022 | Sauder |
| 2022/0317688 A1 | 10/2022 | Li |
| 2022/0386527 A1 | 12/2022 | Schleicher |
| 2023/0000015 A1 | 1/2023 | Herrmann |
| 2023/0073551 A1 | 3/2023 | Holoubek |
| 2023/0139169 A1 | 5/2023 | Cleodolphi |
| 2023/0189690 A1 | 6/2023 | Friedlein |
| 2023/0229163 A1 | 7/2023 | Rust |
| 2023/0240185 A1 | 8/2023 | Zielke |
| 2023/0243693 A1 | 8/2023 | McClelland |
| 2023/0292664 A1 | 9/2023 | Zielke |
| 2023/0389473 A1 | 12/2023 | Reed |
| 2023/0401703 A1 | 12/2023 | Friedlein |
| 2024/0023482 A1 | 1/2024 | Zielke |
| 2024/0065156 A1 | 2/2024 | Woodcock |
| 2024/0081171 A1 | 3/2024 | Schwartz |
| 2024/0090379 A1 | 3/2024 | Eichhorn |
| 2024/0373785 A1 | 11/2024 | Risius |
| 2024/0389494 A1 | 11/2024 | Vorobiev |
| 2025/0185540 A1 | 6/2025 | Eichhorn |
| 2025/0194459 A1 | 6/2025 | Roe |
| 2025/0351773 A1 | 11/2025 | Zielke |

FOREIGN PATENT DOCUMENTS

| | | | |
|---|---|---|---|
| BR | 102017018379 A2 | | 5/2018 |
| CA | 2313376 | | 7/2000 |
| DE | 1928065 A1 | * | 5/1970 |
| DE | 112014000906 T5 | | 11/2015 |
| EP | 2191439 B1 | | 2/2009 |
| EP | 2047738 A2 | | 4/2009 |
| EP | 3146831 B1 | | 3/2017 |
| EP | 2944179 B1 | | 11/2017 |
| EP | 3245859 A1 | | 11/2017 |
| EP | 3245859 B1 | | 4/2019 |
| EP | 3095313 B1 | | 5/2019 |
| EP | 3972381 A1 | | 3/2022 |
| JP | 6216795 B2 | | 10/2017 |
| WO | 2013078328 A2 | | 5/2013 |

OTHER PUBLICATIONS

Reichhardt Electronic Innovations, "PSR Sensor Guidance", Jan. 2021, www.reichhardt.com/us_products_autosteer-system_ autoguidance-tac.html.

Headsight, Inc., "Row Guidance for Corn", Jan. 2021, https://headsight.com/row-guidance-corn.

Gore, L. M. 1996. Report: Stalk counter for VRT study fall of 1995. Deere & Co. Moline, IL.

Contributions to Wikimedia projects (Feb. 20, 2020), Numerical integration. Wikipedia. Https://web.archive.org/web/20200325094046/https://en.wikipedia.org/wiki/numerical_integration (Year: 2020).

Area of a circle (Mar. 10, 2020). Wikipedia. Https://web.archive.org/web/20200325064526/https://en.wikipedia.org/wiki/Area_of_acircle (year 2020).

(56)        References Cited

OTHER PUBLICATIONS

Miller et al (Nov. 16, 2016). The Plant Journal. https://onlinelibrary.wiley.com/doi/pdf/10.1111/tpj.13320.

Baweja et al., "StalkNet: A Deep Learning Pipeline for High-throughput Measurement of Plant Stalk Count and Stalk Width".

Birrell et al., "Corn Population Sensor for Precision Farming", American Society of Agricultural Engineers. Annual Meeting, 1995, vol. 95, No. 1334, Publisher: ASAE.

"Harvest Study Reveals most corn heads leaving yield in the field.", 2020 Special Report, 2020, Row by Row.

Farm Show, "Easton Goers, Inc. Space Wheel Checks Seed Placement in Field—Space Cadet", 1996, Publisher: Farm Show.

D. Easton, "Corn Population and Plant Spacing Variability: The Next Mapping Layer", 1996, pp. 723-727, Publisher: ASA-CSSA-SSSA, Published in: Madison, WI.

Hummel et al., "Sensing Corn Population—Another Variable in the Yield Equation".

Jonathan P. Kelly, "By-Plant Prediction of Corn Grain Yield Using Height and Stalk Diameter", 2009, Publisher: Faculty of the Graduate College of the Oklahoma State University.

Haizhou Li, "Design and Evaluation of a Non-Intrusive Corn Population Sensor", Trace: Tennessee Research and Creative Exchange, Doctoral Dissertations, Graduate School, Aug. 2007, Publisher: University of Tennessee, Knoxville.

Luck et al., "Sensor Ranging Technique for Determining Corn Plant Population", Faculty Papers and Publications in Animal Science—Animal Science Department, 2008, vol. 920, Publisher: University of Nebraska—Lincoln.

Plattner et al., "Corn Plant Population Sensor for Precision Agriculture", 1996.

"AutoTrac RowSense", Precision AG, , Page(s) https://www.deere.com/sub-saharan/en/technology-products/precision-ag/autotrac-rowsense/, Publisher: John Deere SSA.

Reichhardt Electronic Innovations, "PSR Sensor Guidance", , Page(s) www.reichhardt.com/us_products_autosteer-system_autoguidance-tac.html, Publisher: Reichhardt Electronic Innovations.

Headsight, Inc., Row Guidance for Corn, Jan. 2021, Page(s) https://headsight.com/row-guidance-corn, Publisher: Headsight, Inc.

Yeyin Shi, "Corn Plant Location, Spacing and Stalk Diameter Measurements Using Optical Sensing Technologies", May 2014, Publisher: Faculty of the Graduate College of the Oklahoma State University.

Shrestha et al., "Automatic Corn Plant Population Measurement Using Machine Vision", Transactions of the ASAE, 2003, pp. 559-565, vol. 46(2), Publisher: American Society of Agricultural Engineers.

Sudduth et al., "Field Evaluation of a Corn Population Sensor", 2000.

Yu et al., "Outlier Elimination for Robust Ellipse and Ellipsoid Fitting", Oct. 24, 2009.

Of GIS AG Maps (here in as GIS), "Yield Monitor Data Post-Calibration (Linear and Non-Linear) Examples", Jan. 20, 2022, 8 pages + 1 SS page (9 pgs total).

Li, Dawei, et al. "An overlapping-free leaf segmentation method for plant point clouds." IEEE Access 7 (2019): 129054-129070 (Year: 2019).

Sprague et al., "Corn Ear Detection and Orientation Estimation Using Deep Learning", 2024, https://arxiv.org/abs/2412.14954.

Lensing, Keith, "Algorithm Development of a Multi-Section Crop Detection System for a Corn Head", 2015, https://dr.lib.iastate.edu/entities/publication/8cb6f0d6-31e2-4ff9-8c1e-eb70dc210e5f.

Luck et al., "Precision Agriculture—Best Management Practices for Collecting Accurate Yield Data and Avoiding Errors during Harvest", 2014, 6 pages.

* cited by examiner

Time

Time

APPARATUS, SYSTEMS AND METHODS FOR ELIMINATING CROSS-TRACK ERROR

CROSS-REFERENCE TO RELATED APPLICATION(S)

This application is a continuation of U.S. application Ser. No. 16/918,300, filed Jul. 1, 2020, and entitled "Apparatus, Systems and Methods for Eliminating Cross-Track Error," which is hereby incorporated herein by reference in its entirety for all purposes.

TECHNICAL FIELD

The disclosed technology relates generally to devices, systems and methods for steering row crop harvesters and a system for determining cross track error. This has implications in many agricultural applications.

BACKGROUND

The disclosure relates to devices, systems, and methods for elimination or reduction of cross-track error in agricultural applications.

BRIEF SUMMARY

One general aspect includes a cross track error system including: a row unit; a set of stripper plates disposed on the row unit, the stripper plates defining a stripper plate gap; at least one resilient member disposed on the row unit proximal to an entrance to the stripper plate gap; and a sensor in communication with the at least one resilient member, where the sensor is constructed and arranged to measure deflection of the at least one resilient member as a stalk passes through the row unit.

Implementations may include one or more of the following features. The system where the deflection of the at least one resilient member corresponds to cross track error. The system where the row unit is disposed on a corn head attached to a harvester. The system where the system is further configured to command an automated steering system to steer the harvester to correct cross track error. The system where the system is configured to command an automated steering system to align the stripper plate gap with an incoming plant row. The system further including a display in communication with the sensor. The system where the at least one resilient member is comprised of polyurethane rubber.

Another general aspect includes a method of detecting cross track error including measuring magnitude and duration of deflection of a first resilient member and a second resilient member via a sensor, the first and second resilient members disposed on a row unit, the row unit disposed on a harvester. Other embodiments of this aspect include corresponding computer systems, apparatus, and computer programs recorded on one or more computer storage devices, each configured to perform the actions of the method.

Implementations may include one or more of the following features. The method where the row unit further includes a set of stripper plates defining a gap. The method where the first and second resilient members are proximal to the set of stripper plates. The method where first and second resilient members are deflected when corn stalks enter the row unit. The method further including adjusting a width of the stripper plate gap. The method further including detecting heading error. The method further including determining a difference between the deflection of the first resilient member and the deflection of the second resilient member; and steering the harvester in response to the difference. Implementations of the described techniques may include hardware, a method or process, or computer software on a computer-accessible medium.

Another general aspect includes a cross track error system including: a corn head; at least one row unit disposed on the corn head. The at least one row unit including a set of stripper plates, at least one resilient member disposed proximal to the stripper plates, and at least one sensor unit in communication with the at least one resilient member. The cross track error system also includes a processor where the processor is constructed and arranged to process signals generated by the at least one sensor unit in response to deflection of the at least one resilient member. Other embodiments of this aspect include corresponding computer systems, apparatus, and computer programs recorded on one or more computer storage devices, each configured to perform the actions of the methods.

Implementations may include one or more of the following features. The system further including a first resilient member and a second resilient member. The system where the first resilient member and second resilient member are disposed across a gap defined by the set of stripper plates. The system where the processor measures cross track error. The system configured to command an automated steering system to align the gap with an incoming plant row. The system where the at least one resilient member is comprised of polyurethane rubber. Implementations of the described techniques may include hardware, a method or process, or computer software on a computer-accessible medium.

While multiple embodiments are disclosed, still other embodiments of the disclosure will become apparent to those skilled in the art from the following detailed description, which shows and describes illustrative embodiments of the disclosed apparatus, systems and methods. As will be realized, the disclosed apparatus, systems and methods are capable of modifications in various obvious aspects, all without departing from the spirit and scope of the disclosure. Accordingly, the drawings and detailed description are to be regarded as illustrative in nature and not restrictive.

DETAILED DESCRIPTION

The various embodiments disclosed or contemplated herein relate to a corn head cross track error (XTE) sensor and associated systems, methods, and devices for use with an agricultural vehicle, such as a harvester, having an automatic or assisted steering system.

Figure 1:
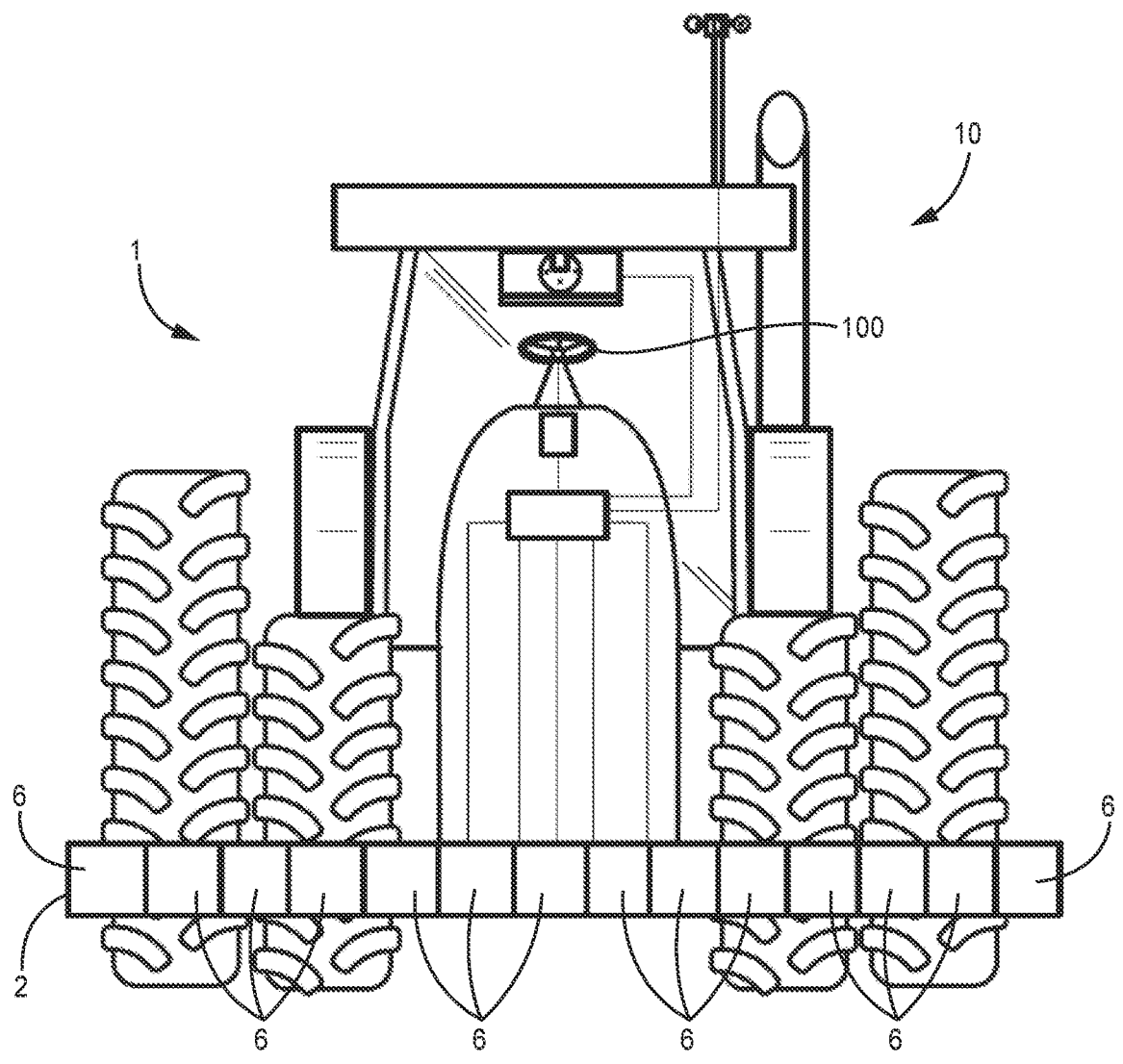
FIG. 1 is a front view schematic of an agricultural vehicle with a corn head.
Figure 2:
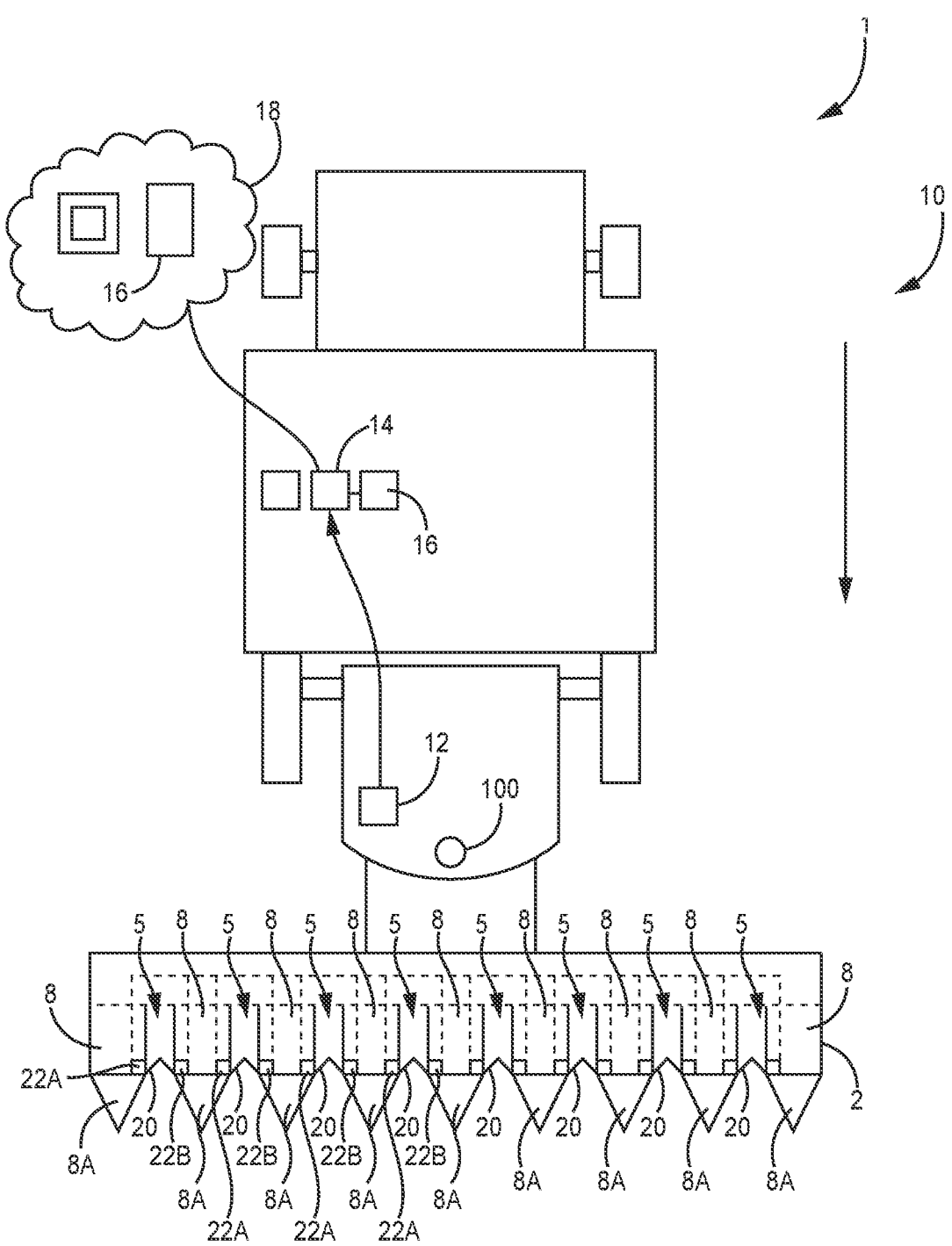
FIG. 2 is a top view schematic of an agricultural vehicle with a corn head.

Turning to the figures in greater detail, FIGS. 1 and 2 depict exemplary vehicles 1 having a corn head 2 and assisted steering system 100 configured to harvest row crops. In various implementations such as that of FIG. 2, a harvester 1 is configured to harvest crops through the row units 6 disposed on the corn head 2, as would be readily appreciated.

The disclosed implementations of the XTE system 10 measure deflection, distance, and or other parameters at the point where stalks enter row unit 6 on the corn head 2. As would be readily appreciated, stalks typically enter the row unit 6 at the stripper deck plate gap 5.

Further, the system 10 in some implementations includes resilient members 20 in communication with and/or disposed on sensor units 22A, 22B. In various implementations, the sensor units 22A, 22B are in communication with a display 12 and/or processor 14 for processing of signals generated by the resilient members 20 and sensor units 22A, 22B. In alternate implementations, the sensor units 22A, 22B can be constructed and arranged like those taught in U.S. patent application Ser. No. 16/445,161, which is incorporated herein by reference for all purposes.

In various implementations, the system 10 may further include a storage medium 16 to store data. In some implementations, the storage 16 may be located on the harvester 1 or alternatively the storage 16 may be cloud 18 based.

Figure 3:
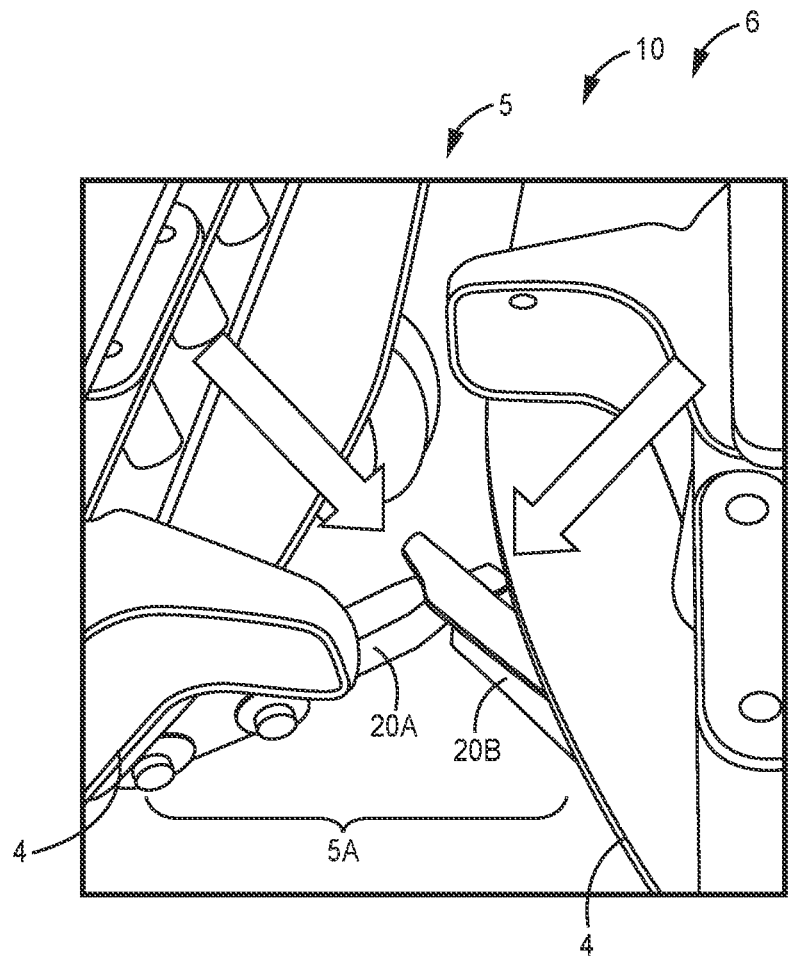
FIG. 3 is a close-up perspective view of resilient members disposed within the stripper plate gap according to certain implementations of the cross track error system.

Turning to FIG. 3, in certain implementations, the resilient members 20 are mounted under the front of the stripper plates 4, as disclosed in provisional patent application 62/895,676 filed on Sep. 4, 2019, entitled "Apparatus, Systems and Method for Stalk Sensing," which is incorporated by reference herein. In these implementations, XTE is measured by comparing the resilient member 20 deflection magnitude and/or duration, as will be discussed further below.

Figure 4:
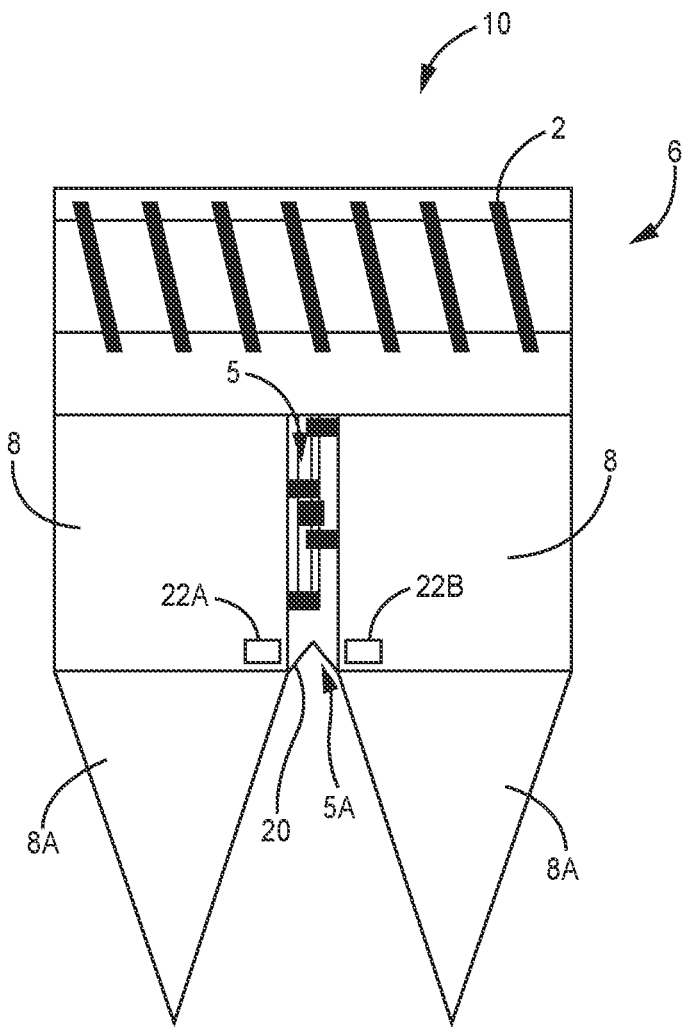
FIG. 4 is top view schematic of resilient members disposed within the stripper plate gap according to certain implementations of the cross track error system.

FIGS. 3 and 4 depict exemplary row units 6 of a corn head 2 on a row crop harvester (shown in FIG. 1 at 1). In these implementations of the XTE system 10, each row unit 6 includes a set of stripper plates 4 between dividers 8. As would be understood, stripper plates 4 are configured to break corn or other crops from the stalks as the individual row plants enter the gap 5 defined in the stripper plates 4.

In various implementations, the one or more resilient members 20 are constructed of resilient, elastic material. In these implementations, the resilient members 20 are disposed within the gap 5 and are constructed and arranged to be deflected as stalks pass through the stripper plate gap 5, and more specifically in some implementations as the stalks pass through the entrance to the stripper plates 5A. The resilient members 20 in communication with the sensor units 22A, 22B detect the presence and position of individual stalks as they pass through the row units 6.

Placement of the resilient members 20A, 20B at the entrance 5A to the stripper plates 4 is advantageous because it allows for the assisted steering system 100 to align the stripper plate gap 5 with the row. This alignment between the stripper plate gap 5 and the incoming row of stalks is important for efficient harvesting and maintenance of upright stalks, as described herein.

Figure 5A:
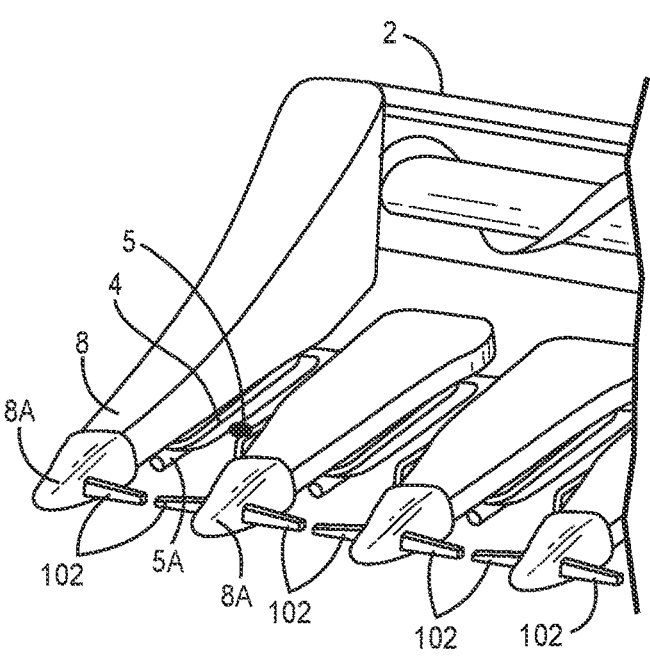
FIG. 5A is a perspective view of a prior art corn head.
Figure 5B:
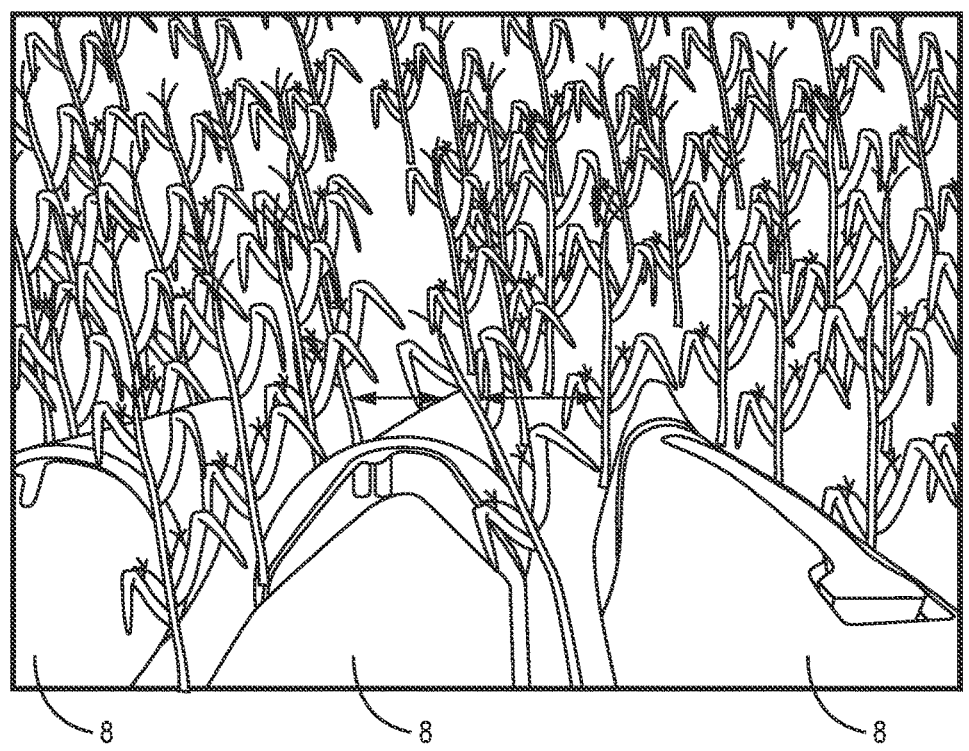
FIG. 5B is a rear perspective view of the snoots of the corn head showing the entry of corn rows, according to prior art implementations.

In various prior known XTE systems, the corn head 2 includes feelers 102 disposed at the front 8A of the snoot (also referred to herein as a "divider" or "row divider") 8, such as shown in FIG. 5A. These known systems measure XTE at the snoot front 8A ahead of the stripper plate gap 5 and entrance 5A to the stripper plates 4. On most corn heads 3 this snoot front 8A is about three (3) feet ahead of the stripper plate entrance 5A. These prior known XTE systems automatically command a harvester steering system to align the snoot front 8A with the middle of the intermediary space between plant rows, such as to provide equal spacing between the snoot front 8A and the adjacent rows, shown for example in FIG. 5B.

Figure 6:
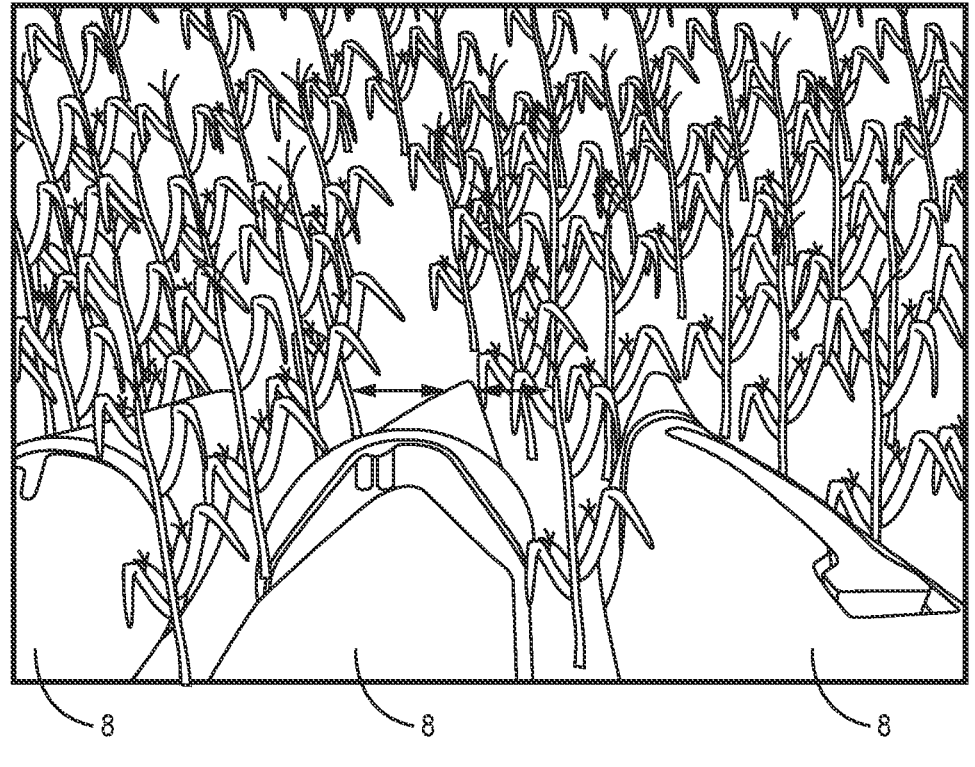
FIG. 6 is a is a rear perspective view of the snoots of the corn head showing the entry of corn rows illustrating snoot front offset and stripper plate gap alignment.

The snoots 8 are straight and thus on curved rows the snoot 8 must be offset in the inter-row space in order to align the stripper plate gap 5 with the incoming stalk row, as shown in FIG. 6. As such, these prior known systems cause the stripper plate gap 5 to be misaligned with the incoming rows, which can cause the stalks to be pushed to the edges of the stripper plates 4 effecting crop yield.

FIG. 6 illustrates how the snoot front 8A must be offset within the row space to align the stripper plate gap 5 with a curved stalk row. By locating the resilient members 20 and measuring XTE at the target steering point, where stalks enter the stripper plate gap 5, the system 10 keeps the stripper plate gap 5 properly aligned on curved and straight rows.

In various implementations, the geometry and stiffness of the resilient members 20A, 20B and their material composition are configured to provide sufficient restoring force to return the resilient members 20A, 20B to their starting, or neutral position rapidly. It is understood that insufficient restoring force will result in a sluggish return of the resilient members 20A, 20B to their neutral position. For example, if a harvester 1 is traveling at six (6) miles per hour and is harvesting stalks spaced one (1) inch apart the system 10 has about 0.01 seconds to differentiate between the stalks. Accordingly, in certain implementations the resilient members 20A, 20B are configured to have between about 0.25 to about 4 pounds of restoring force urging them back into the neutral position. It is appreciated that certain implementations have a total of about 2 pounds of restoring force applied by the resilient members 20A, 20B.

While a resilient member 20A, 20B may not need to return to the fully neutral position in between stalks, the restoring force must urge the resilient members 20A, 20B far enough toward their neutral position to distinguish between individual stalks. If the system 10, cannot distinguish between individual stalks the signals may appear the same as a corn ear or a mass of vegetation.

Conversely, the resilient members 20A, 20B should not be constructed to have excessive restoring force. Excessive restoring force may increase the likelihood of pushing over incoming stalks and/or causing stalks to bunch and potentially plug the corn head, leading to malfunctions. Proper restoring force will not impede crop flow, but be sufficient to still be capable of detecting closely spaced corn stalks.

In various implementations, the one or more resilient members 20 are made of polyurethane rubber, but may also be constructed of other elastic, viscoelastic, or even metal materials. Exemplary materials include, but are not limited to, nitrile, ethylene propylene diene terpolymer (EPDM), neoprene, natural rubber, silicone, fluro-elastomer, and spring steel. In various additional implementations, the resilient member(s) 20 composition may include the addition of other materials that alter the physical properties of the resulting composite material, as would be recognized by those skilled in the art. Examples include, but are not limited to, inclusion of cellulose, aramid, nylon, glass, or carbon fibers.

Figure 7:
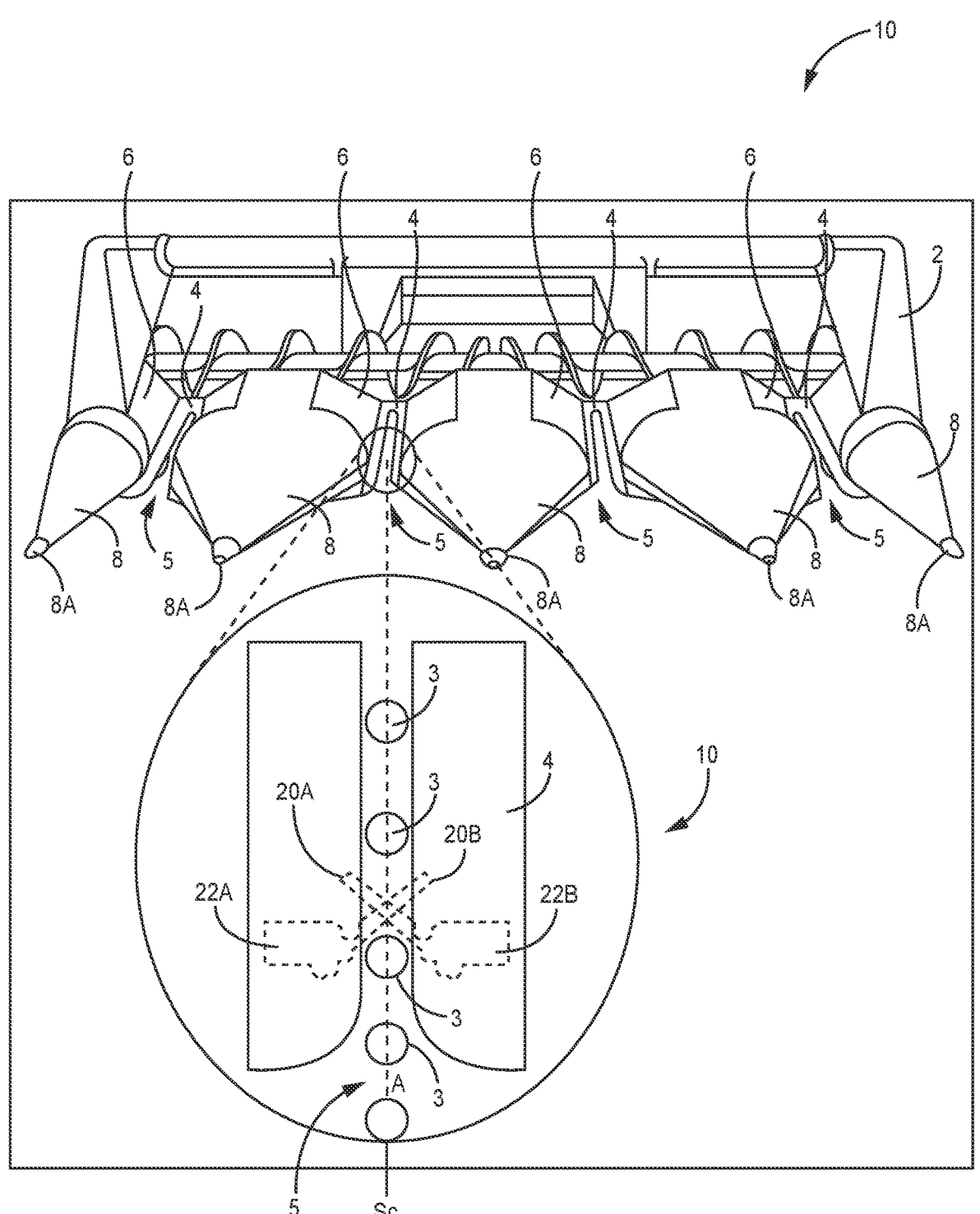
FIG. 7 is top view of the cross track error system showing the resilient members and an aligned row, according to an exemplary embodiment.
Figure 8:
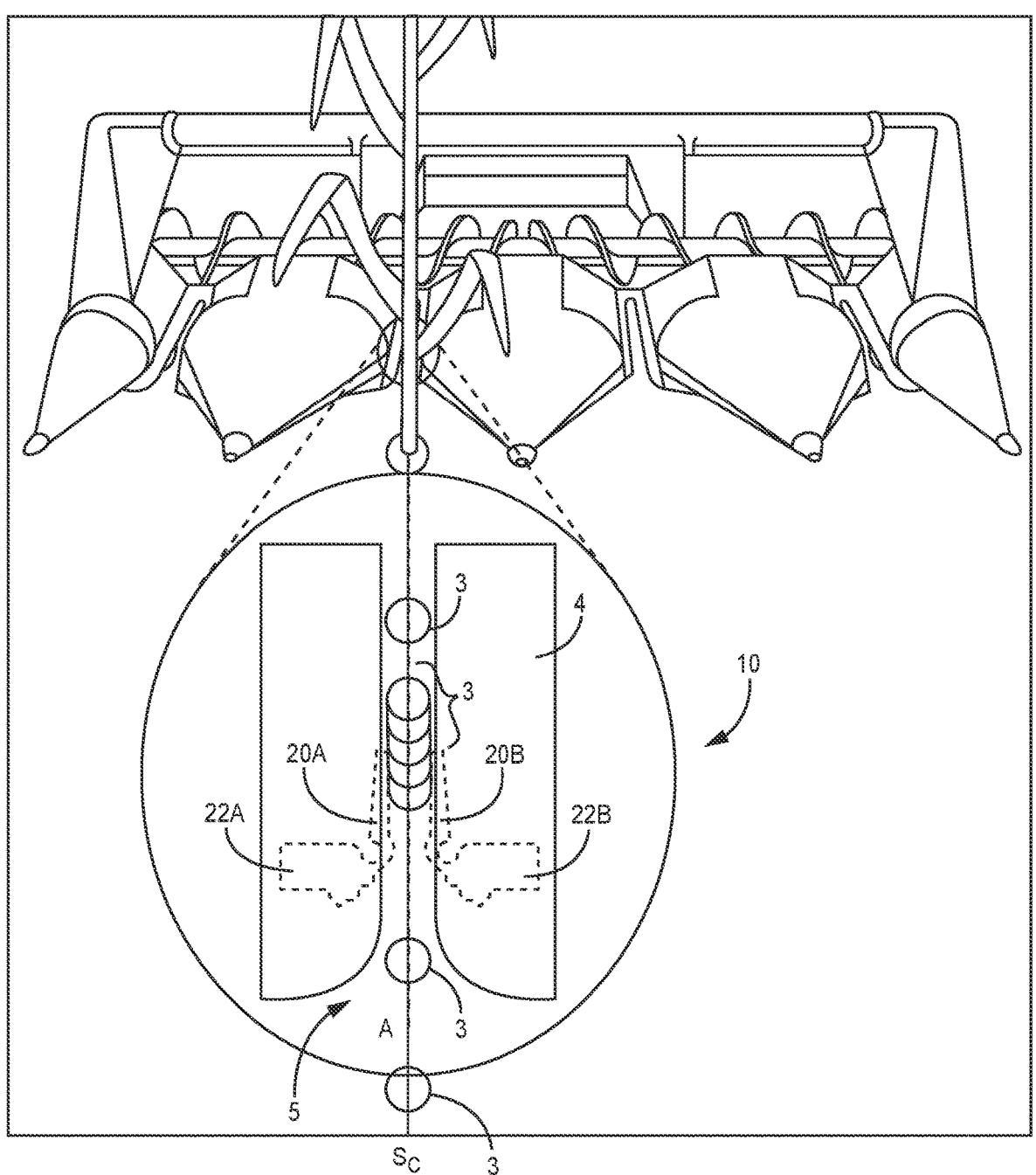
FIG. 8 is top view of the cross track error system showing a stalk in motion through the resilient members, according to an exemplary embodiment.

Turning now to FIGS. 7 and 8, the XTE system 10 is further constructed and arranged to ensure that stalks pass through the stripper plate gap 5 vertically. In an exemplary implementation, when there is no XTE the stalks 3 pass through the gap 5 at a stalk axis $S_C$ that is along or substantially aligned with a row unit 6 central axis A. In these implementations, as the stalks 3 pass through the resilient members 20A, 20B, the stalks deflect each of the resilient members 20A, 20B approximately equally.

It is understood that a misalignment of the stalk axis S from the central axis A causes the stripper plate 4 edges to urge the stalks 3 left or right as they pass through the row unit 6. This misalignment results in XTE shown for example in FIGS. 9-12. Such misalignments are considered steering errors, because they can cause ears to fall off the stalk 3 or push stalks 3 over before the row unit 6 has a chance to strip and gather the ear. These ears may end up on the ground, never to be threshed. As such, to the farmer, they are lost yield and thereby lost profit.

Figure 9:
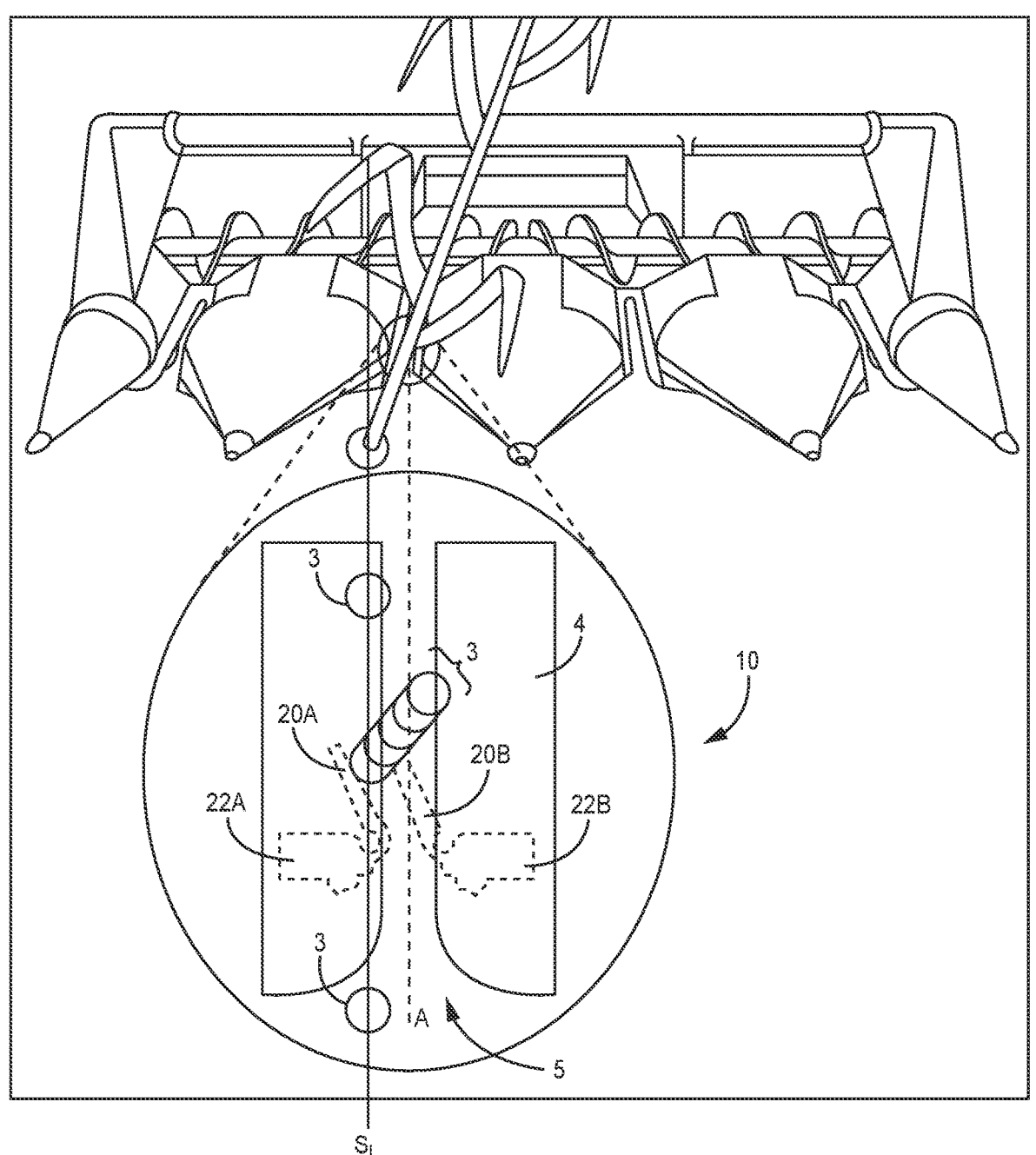
FIG. 9 is top view of the cross track error system showing the resilient members and a mis-aligned row, according to an exemplary embodiment.
Figure 10:
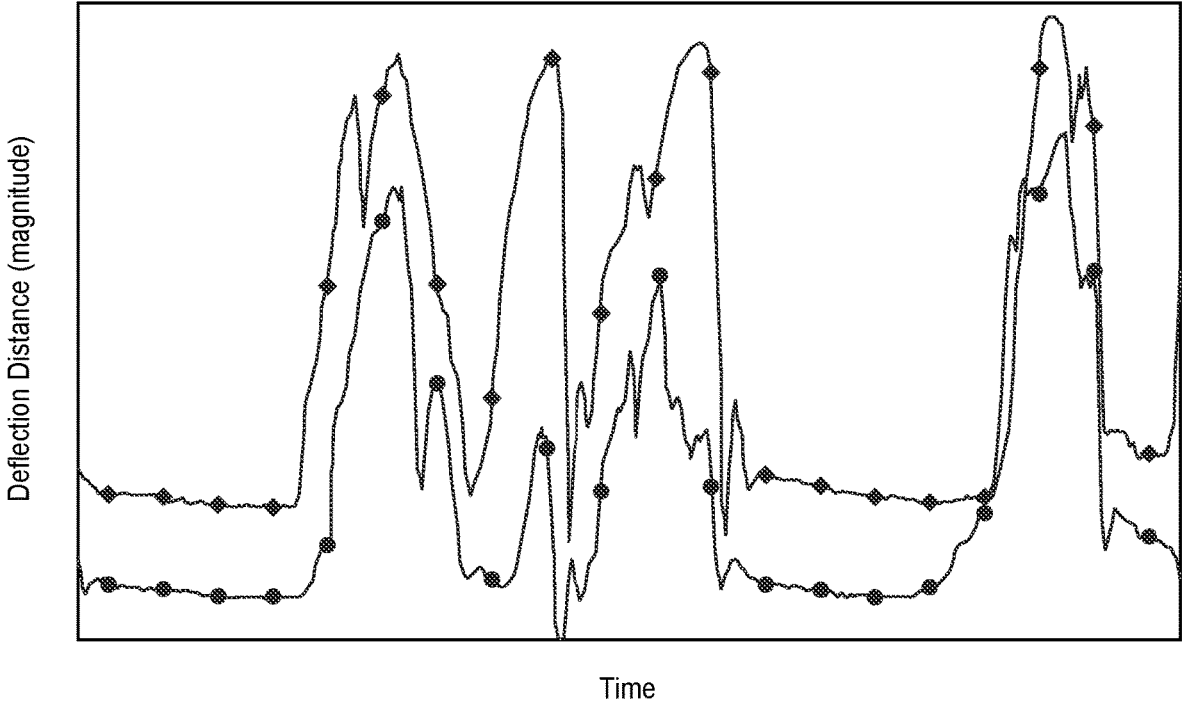
FIG. 10 is a graphical representation of individual resilient member deflection, according to one exemplary implementation.

FIGS. 9-10 are examples of a left XTE with respect to forward harvester 1 travel. In this example, the stalk axis $S_l$ is misaligned to the left of the row unit 6 central axis. The XTE caused by the misalignment is measured by the resilient members 20A, 20B and sensor units 22A, 22B. In these implementations, as the resilient members are deflected by the stalks 3 the sensor units 22A, 22B measure the amount of deflection over time. FIG. 10 is a graph of the right and left resilient member 20B, 20A deflection signal. The x-axis is time, the y-axis is resilient member 20A, 20B deflection distance (magnitude). The line with dots on the graph relates to the left resilient member 20B and the line with diamonds relates to the right resilient member 20A. Because plant stalks 3 are fixed to the ground, when there is a left XTE the right stripper plate 4 pushes the stalk 3 to the left as shown in FIG. 9.

A left XTE, as described above, causes the right resilient member 20A to deflect more and for a longer time than the left resilient member 20B, as shown in FIG. 10. In a left XTE scenario, the right resilient member 20A is typically the first to deflect and the last to return towards a neutral position, resulting in a longer signal duration. In these implementations, the difference between the right resilient member 20B signal and left resilient member 20A signal deflection is proportional to the extent of the actual left XTE. In some implementations, a XTE calibration curve mathematically relates the difference between left and right resilient member 20A, 20B signal deflection to actual left XTE. In various implementations, the system 10 determines the difference in signal deflection and then calculates an estimated left XTE through the XTE calibration curve. Further, in some implementations, the estimated left XTE is inputted to the steering system 100.

Figure 11:
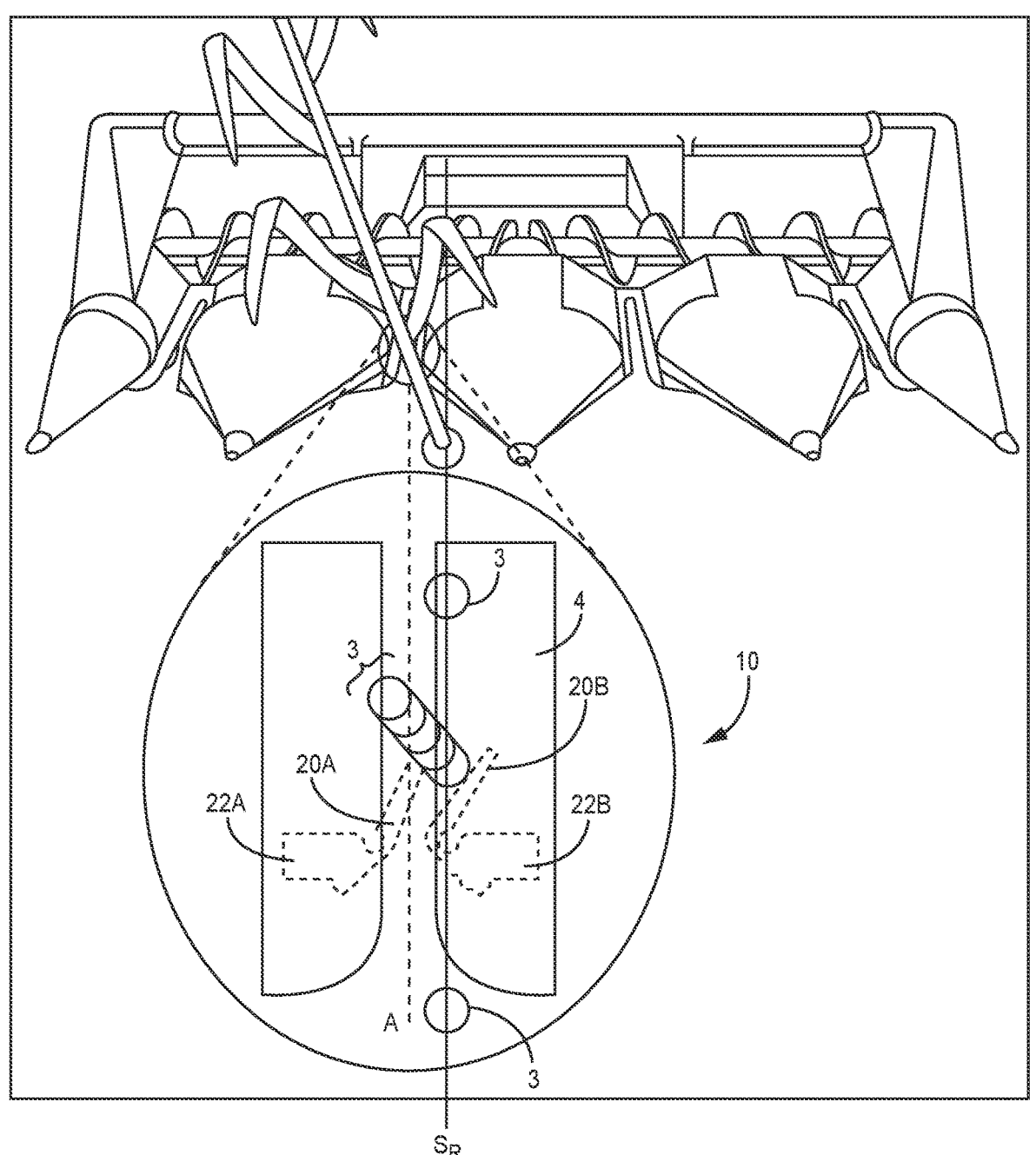
FIG. 11 is another top view of the cross track error system showing the resilient members and a mis-aligned row, according to an exemplary embodiment.
Figure 12:
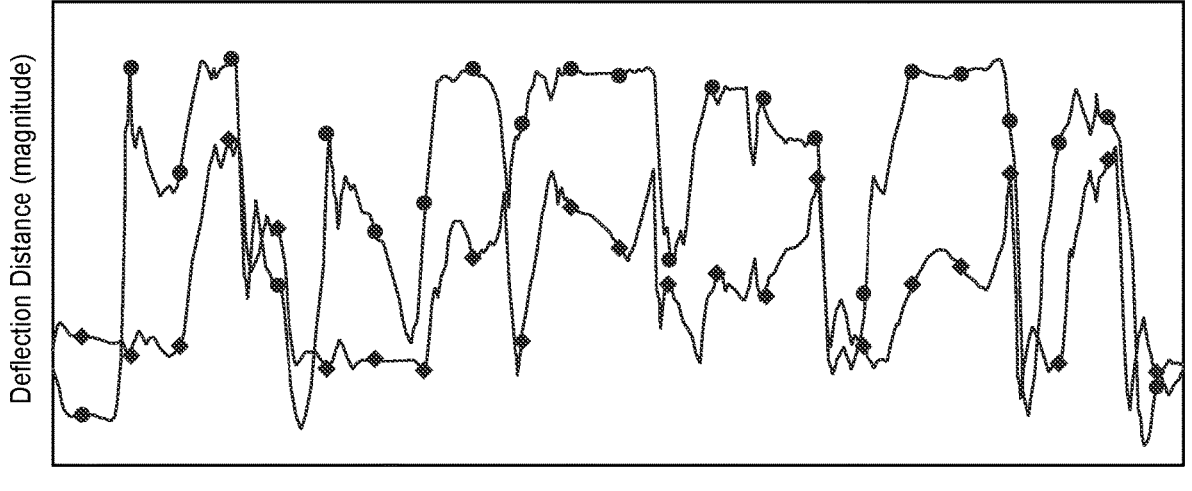
FIG. 12 is another graphical representation of individual resilient member deflection, according to one exemplary implementation.

FIGS. 11-12 are examples of a right XTE with respect to forward harvester 1 travel. The descriptions for left XTE above also apply to FIGS. 11-12. In this example, the stalk axis $S_r$ is misaligned to the right of the row unit 6 central axis A such that the stalk 3 is pushed to the right, and the left resilient member 20B deflection signal is larger than the right resilient member's 20A deflection signal. The difference between the left resilient member 20B signal and right resilient member 20A signal deflection is proportional to the extent of the actual right XTE. In some implementations, a XTE calibration curve mathematically relates the difference between left and right resilient member 20A, 20B signal deflection to actual right XTE. In various implementations, the system 10 determines the difference in signal deflection and then calculates an estimated right XTE through the XTE calibration curve. Further, in some implementations, the estimated right XTE is inputted to the steering system 100.

By computing or integrating the area under the curve value of each resilient member 20A, 20B deflection signal, a mathematical value can be calculated and calibrated to an accurate XTE. Several other mathematical techniques may exist to compare the left and right resilient member 20A, 20B deflection signals. In various implementations, the ground speed, stalk 3 population per area, header 2 height, and stalk 3 size (e.g. diameter) variations can cause variations in the deflection signals. All these parameters may change during a harvest operation. A system requiring unique XTE calibrations for all of these parameter variations is likely too burdensome for the harvester 1 operator to perform. Further accounting for each of these parameters introduces too many sources of potential error. In various implementations, mathematical left and right resilient member 20A, 20B comparison technique that requires only one XTE calibration is used by the system 10.

A ratio method of area under the curve of each resilient member 20A, 20B deflection signal can utilize one XTE calibration for ground speed, stalk population, header height and stalk size variations. Exemplary ratios may be:

$$\frac{\int \text{Right Resilient Member Deflection Signal}}{\int \text{Left Resilient Member Deflection Signal}}$$

or $$\frac{\int \text{Left Resilient Member Deflection Signal}}{\int \text{Right Resilient Member Deflection Signal}}$$

Figure 13:
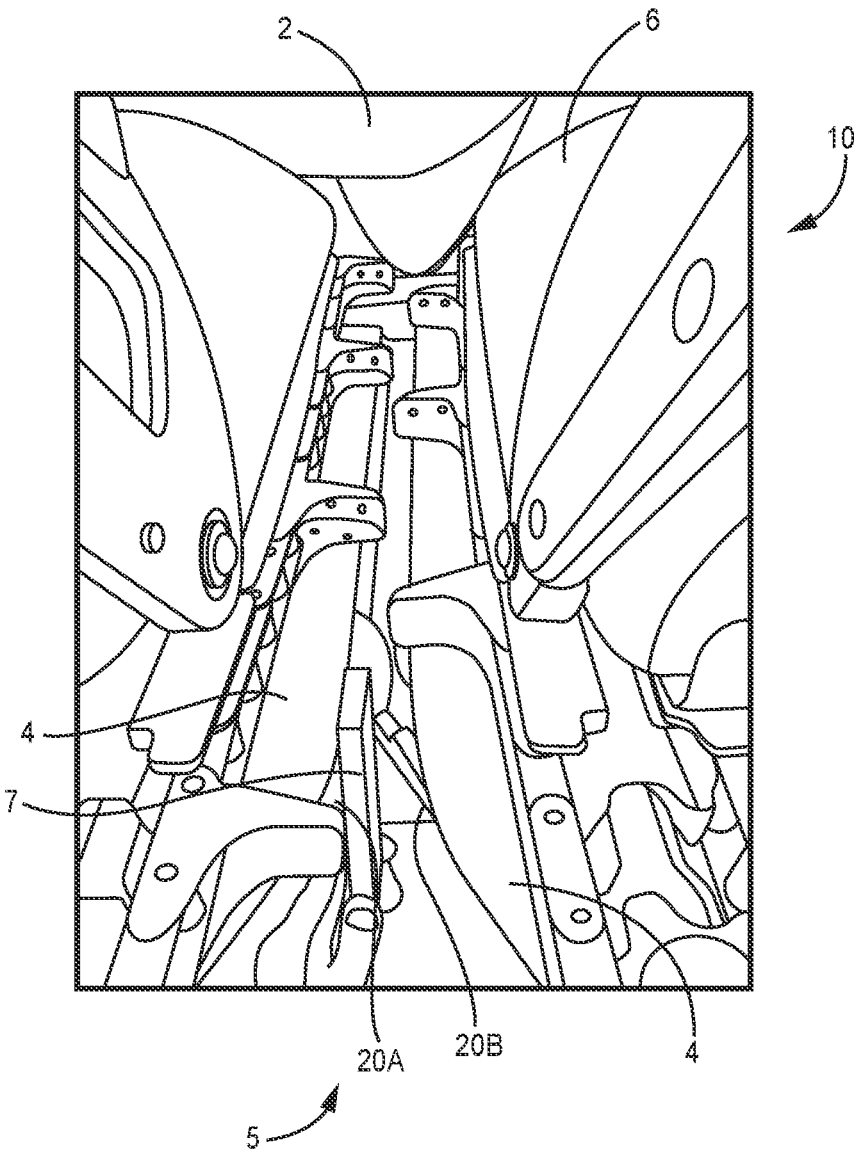
FIG. 13 is a close-up perspective view of resilient member calibration according to certain implementations of the cross track error system.
Figure 14:
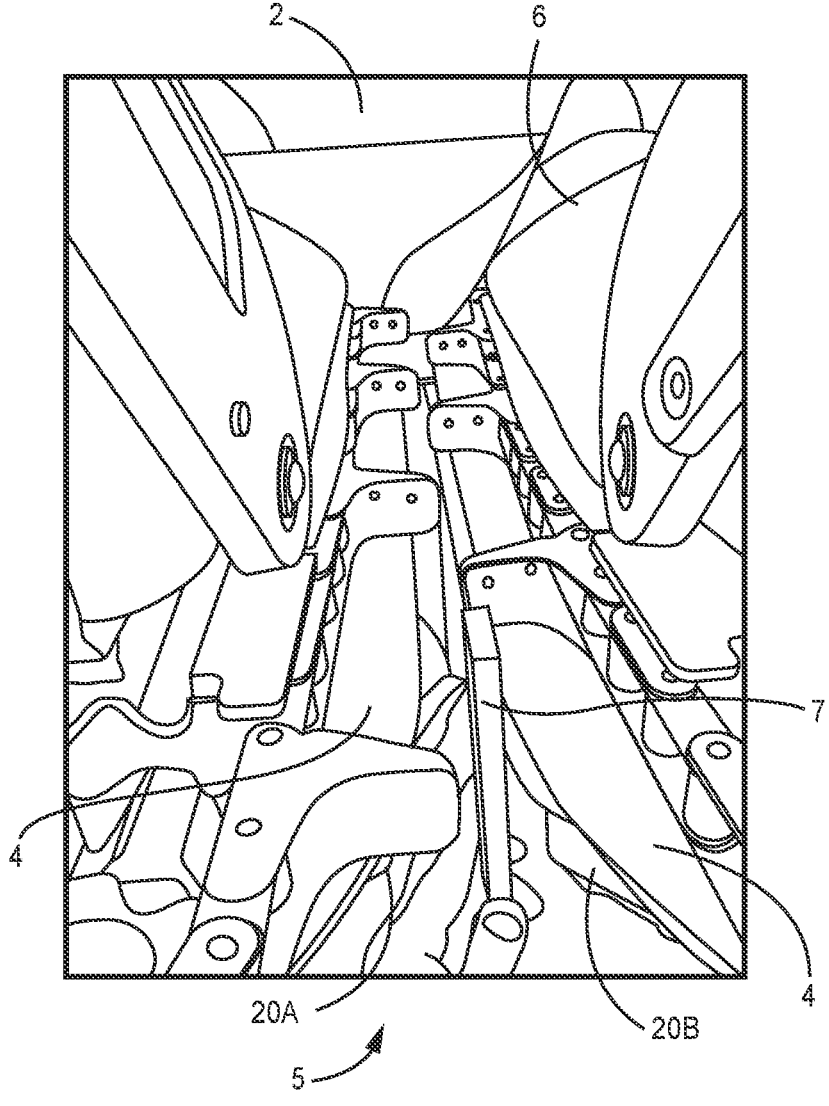
FIG. 14 is a close-up perspective view of resilient member calibration according to certain implementations of the cross track error system.

In various implementations, the stripper plates 4 can be manually or automatically adjusted to increase or decrease the stripper plate gap 5, as discussed in U.S. Provisional Patent Application 63/006,774, filed Apr. 8, 2020, and entitled "Agricultural Devices, Systems, and Methods". In various implementations, the stripper plate gap 5 width is adjusted in accordance with stalk 3 size variations. Various corn head 2 configurations may adjust one or both plates 4. In these implementations, adjustment of the stripper plate 4 gap may change the XTE calibration if the resilient members 20A, 20B do not move with the stripper plates 4. In this case, a new calibration may be performed manually at the sensor as shown in FIGS. 13-14.

In these implementations, to calibrate the system 10 the outside edge of each resilient member 20A, 20B is held vertically flush to the stripper plate 4 edge with a straight edge 7 or jig 7. The system 10 may then record a resilient member 20A, 20B deflection signal set point that corresponds to the stripper plate 4 edge position relative to the resilient member. This process is independently performed for the left and right resilient members 20A, 20B.

In various implementations, the system 10 uses the resilient member 20A, 20B set points to switch to a different predetermined XTE calibration that corresponds to the stripper plate 4 edge position/stripper plate gap 5. The calibration from one row unit 6 may be applied to all other row units 6, or separate calibrations can be performed on each row unit 6.

In a further implementation, each resilient member 20A, 20B may detect the location of the stripper plate 4 edge relative to the resilient member 20A, 20B using a stripper plate 4 edge sensor affixed to the resilient member 20A, 20B or to the stripper plate 4.

In various of these implementations, the system 10 may automatically obtain the stripper plate gap 5 setting/resilient member set points from a storage 16 or memory. In these implementations, the XTE system 10 applies predetermined calibrations unique to each harvester 1 stripper plate 4 edge or gap 5 setting as appropriate. These calibrations may be stored in a look up table in the storage 16 or other memory.

The harvester automatic steering system 100 and the XTE system 10 disclosed herein may be used in conjunction with various heading error detection methods to improve performance on curves, certain exemplary heading error detection methods are set forth below.

One exemplary heading error detection method includes the use of GPS path recordings from prior machine operations. This includes, but is not limited to, path recordings from prior planting, pesticide, and fertilizer machine operations. In some of these implementations, the path recordings are from prior machines automatically steered by row recognition systems similar to those taught in U.S. Pat. No. 9,964,559, which is incorporated here by reference in its entirety. In these implementations, to determine heading error, the automatic steering system 100 selects a near prior machine path and assumes the harvester path curvature will be the same as the prior path curvature.

Another exemplary heading error detection method includes the use of GPS path recordings of the in-situ harvester 1. To determine heading error, the harvester steering system 100 selects a near prior harvester 1 pass from the current harvest operation and assumes the harvester 1 path curvature will be the same as the prior path curvature.

In various implementations, the automatic steering system 100 may steer solely on XTE feedback from the resilient members 20A, 20B and sensor units 22A, 22B. This is possible because the XTE system 10 measures XTE at the target steering point. That is, in various implementations, the steering system 100 is able to steer without heading error.

As would be appreciated, the resilient members 20A, 20B, sensor units 22A, 22B, and system 10 may be used simultaneously to perform various other functions. For example, counting and sizing stalks, detecting a plugged row unit, detecting ear shelling, and other functions as would be recognized. Further, any combination of these functions may be used in conjunction with the disclosed XTE system 10 and steering system 100.

Although the disclosure has been described with reference to preferred embodiments, persons skilled in the art will recognize that changes may be made in form and detail without departing from the spirit and scope of the disclosed apparatus, systems and methods.

What is claimed is:

1. A method comprising:

measuring magnitude or duration of deflection of a resilient member via a sensor, the resilient member disposed on a row unit comprising a set of stripper plates defining a stripper plate gap and wherein the resilient member extends into the stripper plate gap;

sensing alignment of a stalk with the stripper plate gap as the stalk passes though the row unit via deflection signals generated by the sensor as the stalk passes through the row unit;

adjusting periodically a width of the stripper plate gap and detecting the adjusted width of the stripper plate gap; and calibrating the sensor to determine cross track error calibration curves for each adjusted width of the stripper plate gap and storing the cross track error calibration curves.

2. The method of claim 1, further comprising determining an amount of cross track error from the sensed alignment of the stalk.

3. The method of claim 2, further comprising commanding an automated steering system to steer a harvester to correct cross track error.

4. The method of claim 1, further comprising detecting heading error.

5. The method of claim 1, further comprising recalibrating the sensor as the stripper plate gap is adjusted.

6. A system comprising:

(a) a corn head;

(b) at least one row unit disposed on the corn head, the at least one row unit comprising:

(i) a set of stripper plates defining a stripper plate gap, wherein a width of the stripper plate gap is adjustable;

(ii) a first resilient member extending into the stripper plate gap; and (iii) a first sensor unit in communication with the first resilient member configured to sense deflection of the first resilient member and generate corresponding deflection signals; and (c) a processor;

wherein the processor is constructed and arranged to process signals generated by the first sensor unit in response to deflection of the first resilient member, wherein the processor is configured to detect a stalk alignment with the gap between the stripper plates as a stalk passes through the at least one row unit via the deflection signals and wherein the first sensor unit is calibrated to determine cross track error calibration curves for the widths of the stripper plate gaps and storing the cross track error calibration curves.

7. The system of claim 6, wherein the stalk alignment corresponds to cross track error.

8. The system of claim 6, configured to command an automated steering system to align the gap between the stripper plates with an incoming plant row comprising one or more stalks.

9. The system of claim 6, further comprising a second resilient member extending into the stripper plate gap and a second sensor unit in communication with the second resilient member configured to sense deflection of the second resilient member and generate corresponding deflection signals.

10. The system of claim 9, wherein the processor is configured to detect stalk alignment with the gap between the stripper plates via comparison of deflection signals of the first resilient member with deflection signals of the second resilient member.

11. The system of claim 9, wherein the first resilient member and second resilient member are comprised of polyurethane rubber.

* * * * *